No. 840,055. PATENTED JAN. 1, 1907.
F. A. FERGUSON.
CHANGE SPEED GEAR.
APPLICATION FILED MAR. 17, 1906.
3 SHEETS—SHEET 1.
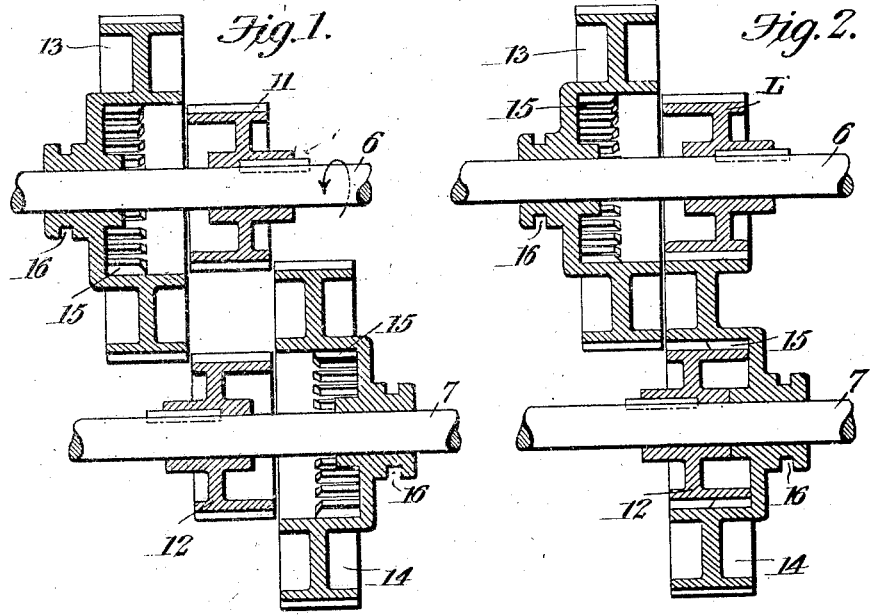
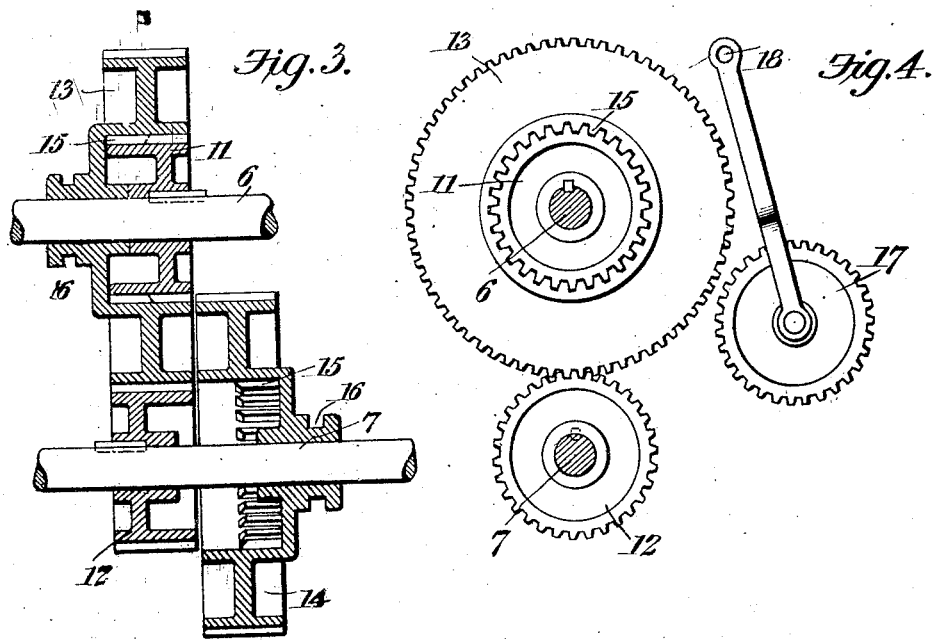
WITNESSES:
Frank A. Ferguson INVENTOR
By C. A. Snow & Co.
ATTORNEYS No. 840,055. PATENTED JAN. 1, 1907.
F. A. FERGUSON.
CHANGE SPEED GEAR.
APPLICATION FILED MAR. 17, 1906.

3 SHEETS—SHEET 2.

WITNESSES:

Frank A. Ferguson INVENTOR

By C. A. Snow & Co.
ATTORNEYS

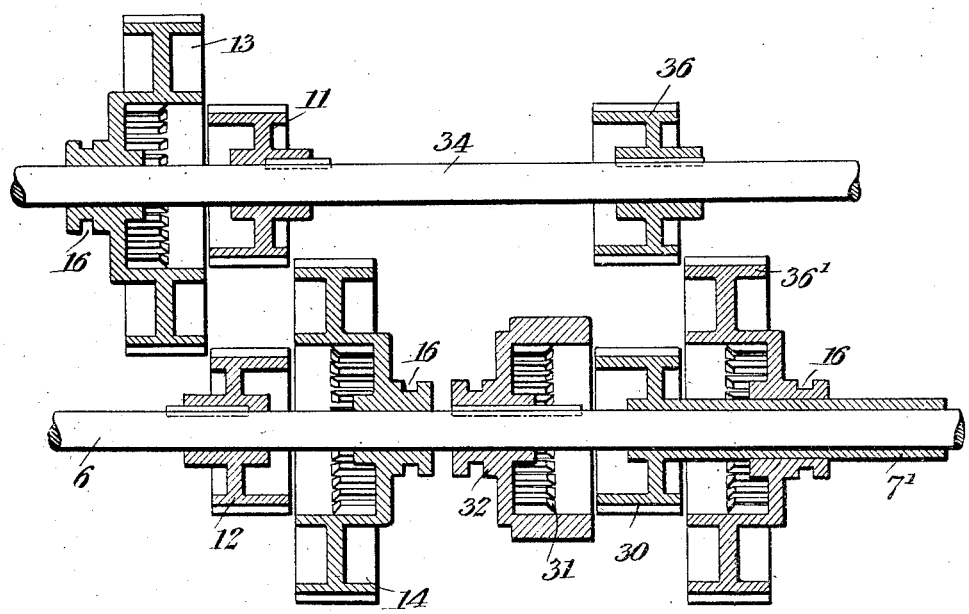

UNITED STATES PATENT OFFICE.

FRANK A. FERGUSON, OF BELLEVILLE, KANSAS.

CHANGE-SPEED GEAR.

No. 840,055.

Specification of Letters Patent.

Patented Jan. 1, 1907.

Application filed March 17, 1906. Serial No. 306,661.

*To all whom it may concern:*

Be it known that I, FRANK A. FERGUSON, a citizen of the United States, residing at Belleville, in the county of Republic and State of Kansas, have invented a new and useful Change-Speed Gear, of which the following is a specification.

The present invention relates to a change-speed device whereby one or more speeds in forward direction and one speed in reverse, or vice versa, can be obtained, and is especially useful in automobile-driving systems wherein the source of power is an explosive-engine. While the invention will be described in this connection, it is obvious that it is capable of use in other applications. Its object is to provide a device of this character which is simple in construction and reliable in operation.

For a detail understanding of the features of construction and the mode of operation attention is directed to the following description, while the features of novelty will be pointed out in the claims appended hereto.

Figure 5:
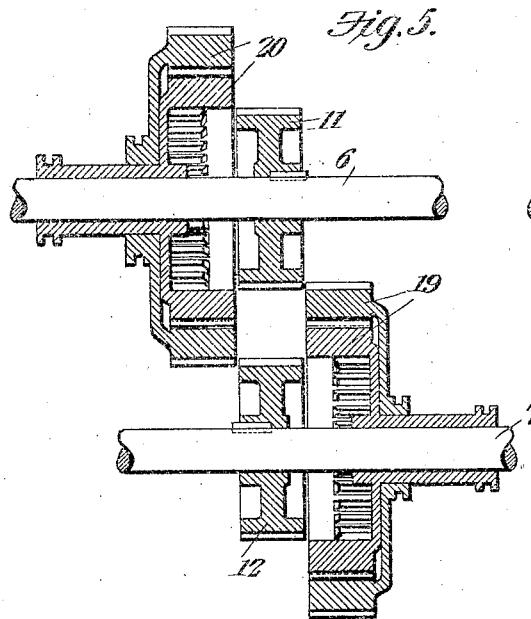
Figure 6:
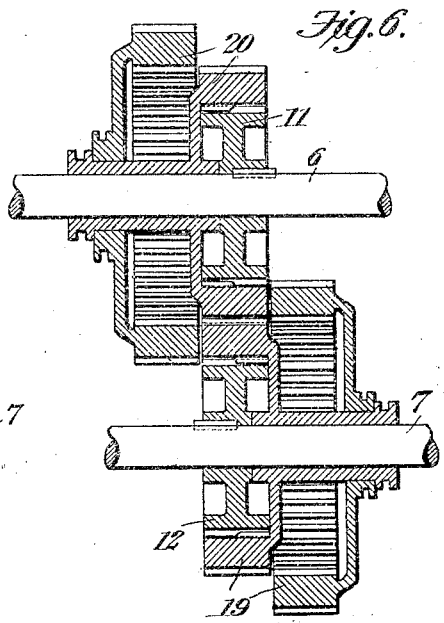
Figure 7:
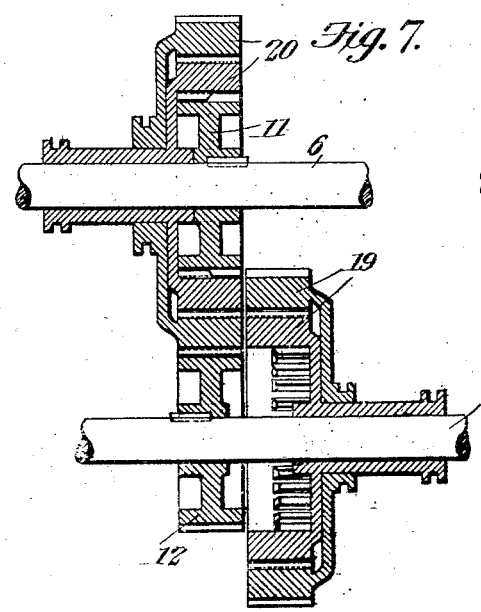
Figure 8:
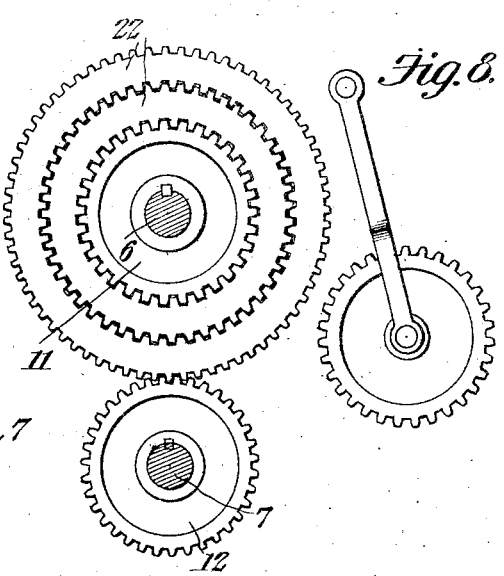

In the accompanying drawings, which illustrate one embodiment of which the invention is capable, Figures 1 to 3, inclusive, are sectional views through the change-speed gear of a two-speed forward type, showing the gears in different positions. Fig. 4 is a transverse view showing the reversing-gear. Figs. 5, 6, and 7 are longitudinal sections of a modified form of gear for obtaining three forward speeds, and Fig. 8 is a transverse section through the modified form of gear. Fig. 9 illustrates a modification of the invention wherein the driving-shaft is hollow and is mounted on the engine-shaft, provision being made for coupling the shafts to secure one speed and for effecting the driving at other speeds through the means of a counter-shaft.

Referring to the drawings, 6 represents the shaft of an engine of the ordinary explosive type. Arranged parallel to the shaft 6 is a second shaft 7, which receives rotation at one or more speeds in one direction and a single speed in reverse direction through the change-speed device herein shown. Suitable actuating-levers and intermediate connecting mechanism for shifting the gears for obtaining the different speeds or direction of rotation are employed, but are not shown in the present case for clearness of illustration.

Referring to Figs. 1 to 3, inclusive, 11 is an externally-toothed gear keyed to the driven shaft 7. The diameter of each gear or the distance between the shafts is such that there is a space into which one or more combined clutch and gear members are adapted to be moved, one at a time, for either high or low speed. These members are shown at 13 and 14, respectively. The member 13 is provided with external teeth which are adapted to mesh with the teeth of the gear 12 and are preferably of the same length as the teeth on the latter, and similar teeth on the member 14 are adapted to mesh with the teeth on the gear 11. The central portion of each member is reëntrant, forming a cylindrical surface having internal teeth 15, which are adapted to mesh with the teeth of the gears 11 and 12 and serve as means for clutching the member 13 with the gear 11 and the member 14 with the gear 12. The internal teeth of the members 13 and 14 are of less length than the external teeth on the said members, so that the latter teeth will engage their respective gears 11 and 12 before the clutch action takes place. The driving and driven gears 11 and 12 are preferably located in the same transverse plane, since by so doing the length of the teeth of the members 13 and 14 can be reduced to a minimum. The members 13 and 14, which are loose on their respective shafts, are each provided with a grooved portion 16 at their hubs, in the grooves of which a bifurcated end of a suitable actuating-lever (not shown) engages.

The position which the gears occupy in Fig. 1 represents a condition when the engine is running idle. When it is desired to start the automobile, the combined clutch and gear member 14 is thrown into mesh with the gears 11 and 12, as shown in Fig. 2, so that the driven shaft 7 is rotated at the lower speed. When it is desired to change to higher speed, the member 14 is unclutched and the member 13 moved into engagement with the gears 11 and 12, as shown in Fig. 3. This operation may be performed by shifting the member 13 to the right, Fig. 3, by which movement the member itself disengages the member 14, or it can be done by two separate operations—namely, first disengaging the member 14 and immediately throwing in the member 13. Suitably located at one side of the driving and driven gears 11 and 12 is an idler-gear 17, Fig. 4, which is adapted to swing on a pivot 18, whose axis is parallel with the driving and driven shafts, and its teeth are adapted to mesh simultaneously with the gears 11 and 12. When the gears are thus in mesh, the driven shaft 7 will be rotated in a reverse direction.

In a construction for obtaining a higher number of speeds than is possible with the construction above described I employ sets of combined clutch and gear members which are adapted to be separately actuated by independent levers. This construction is shown in Figs. 5, 6, 7, and 8. A low-speed set of members is indicated at 19 and a high-speed set at 20. By this arrangement when the set 19 is thrown into mesh with the gears 11 and 12 both members of the set act as a unit and drive the driven shaft at a minimum speed, and when the high-speed set is thrown into mesh it also drives the driven shaft 7 at high speed, as shown in Fig. 7. When it is desired to obtain a speed intermediate high and low, one member of one set is thrown into mesh with the corresponding member of the other set and at the same time into mesh with the gears 11 and 12, as shown in Fig. 6.

Fig. 8 shows a construction similar to that shown in Fig. 4 for obtaining a reverse drive in the three-speed construction.

In the construction shown in Fig. 9 the engine-shaft 6 is shown as extending through a driving-shaft 7′, the latter being hollow in this case and being provided at one end with a pinion or clutch disk 30, with which may engage a clutching member 31, having internal teeth, said clutching member 31 being feathered to the shaft 6 and provided with suitable grooved sleeve 32 for effecting movement toward and from the pinion 30. This affords a means for clutching the two shafts together to secure uniform movement. The shaft 6 further carries a pinion 12 and member 14 of the character shown in Fig. 1, and with this may engage a pinion 11 and a member 13 of the type illustrated in Fig. 1, that is mounted on shaft 6. In this case the operation is the same as previously described, and movement may be transmitted from the shaft 6 to the counter-shaft 34 at either high or low speed. The shaft 34 carries a pinion 36, which may be forced into mesh with a gear 36′, that is loose on the driving-shaft 7′ and is provided with internal teeth for engaging the pinion 30. When it is desired to transmit movement to the counter-shaft, the member 31 is kept out of engagement with the pinion 30, while member 36′ is moved into engagement therewith, and then the high and low speed connections may be adjusted as desired. For the intermediate speed the counter-shaft connections are moved to inoperative position and the member 31 is moved into engagement with the pinion 30.

Having thus described the invention, what is claimed is—

1. A change-speed gear including parallel shafts, gears secured to the shafts, and permanently separated from each other, and a member carried by one of the shafts and adjustable in the direction of the length of said shafts, said member being arranged to engage both gears and transmit movement from one to the other.

2. A change-speed gear including parallel driving and driven shafts, a fixed gear on each shaft, the gears being arranged in the same transverse plane and permanently separated from each other, and a combined clutch and gear member carried by one of the shafts and movable into clutching engagement with the gear of the same shaft and into mesh with the gear of the other shaft.

3. A change-speed device comprising parallel driving and driven shafts, gears keyed thereto and permanently separated from each other, a combined clutch and gear member on each shaft which when one is in mesh with the gears drives the driven shaft at high speed and when the other is in mesh drives the said shaft at a lower speed.

4. A change-speed gear, comprising parallel driving and driven shafts, gears keyed thereto and arranged in the same transverse plane, a combined clutch and gear member rotatable with and longitudinally movable on each shaft, and separate means for actuating said members.

5. A change-speed gear, comprising parallel driving and driven shafts, gears mounted thereon which are permanently separated from each other, a combined clutch and gear member movably mounted on one of the shafts and rotatable therewith which is adapted to connect the gears in operative relation for forward rotation, and an idler-gear adapted to connect the driving and driven gear in operative relation for reverse rotation.

6. A change-speed gear, comprising parallel driving and driven shafts, gears mounted thereon which are permanently separated, and a set of combined clutch and gear members on each shaft which are each adapted to be connected as a unit with the said gears for driving the driven shaft at different speeds.

7. A change-speed gear, comprising parallel driving and driven shafts, gears mounted thereon which are permanently separated, a set of combined clutch and gear members on each shaft which are each adapted to be connected as a unit with the said gears for driving the driven shaft at different speeds, and an idler-gear mounted to mesh with the gears on the driving and driven shafts for rotating the latter in reverse direction.

8. A change-speed gear including a pair of shafts gear and clutching members, the latter being provided with internal teeth of such length as to insure disengagement of one member before a second member can be moved to operative position.

9. In a change-speed gear, parallel shafts, gears permanently secured thereto, combined clutch and gear members carried by the shafts and movable into mesh with one of the gears and into clutching engagement with the other gear.

10. A change-speed gear including parallel shafts, gears permanently secured to the shafts, and combined clutch and gear members loose on the shafts, and each provided with internal clutching-teeth, said members being disposed, respectively, on opposite sides of the permanent gears and having their clutching-teeth arranged to prevent simultaneous engagement with the gears.

In testimony that I claim the foregoing as my own I have hereto affixed my signature in the presence of two witnesses.

FRANK A. FERGUSON.

Witnesses:
  W. H. BELL,
  C. E. STILWELL.